Nov. 4, 1924.  
G. W. BLACKBURN  
SPEEDOMETER  
Filed Jan. 3, 1921    5 Sheets-Sheet 1

Witness  
Edward G. Wray.

Inventor  
Guy W. Blackburn  
by Parker & Carter  
Attorneys

Nov. 4, 1924.　　　　　　　　　　　　　　　　　　　　1,514,125
G. W. BLACKBURN
SPEEDOMETER
Filed Jan. 3, 1921　　　　　　5 Sheets-Sheet 3

Witness
Edward T. Wray.

Inventor
Guy W. Blackburn
by Parker & Carts
Attorneys

Nov. 4, 1924.
G. W. BLACKBURN
SPEEDOMETER
Filed Jan. 3, 1921
1,514,125
5 Sheets-Sheet 4

Witness
Edward T. Wray.

Inventor
Guy W. Blackburn
by Parks & Carts
Attorneys

Nov. 4, 1924.

G. W. BLACKBURN 1,514,125

SPEEDOMETER

Filed Jan. 3, 1921

Witness
Edward T. Wray

Inventor
Guy W. Blackburn
by Parks & Parks
Attorneys

Patented Nov. 4, 1924.

1,514,125

UNITED STATES PATENT OFFICE.

GUY W. BLACKBURN, OF ELGIN, ILLINOIS.

SPEEDOMETER.

Application filed January 3, 1921. Serial No. 434,482.

*To all whom it may concern:*

Be it known that I, GUY W. BLACKBURN, a citizen of the United States, residing at Elgin, in the county of Kane and State of Illinois, have invented a certain new and useful Improvement in Speedometers, of which the following is a specification.

My invention relates to improvements in speedometers of electric type for the purpose of indicating speed mileage, etc., of motor and other vehicles. One object of my invention is to provide an arrangement whereby only an electric connection is needed between the vehicle wheels and the speedometer, thus doing away with universal joints, drive shafts and the like. Another object is to provide a speedometer which can be easily and conveniently adjusted, tested and kept to speed. Another object is to provide a speedometer which will be accurate and not subject to local temperature, electro-magnetic and other variations which are likely to throw it out of accurate operation. Other objects will appear from time to time in the specification.

My invention is illustrated more or less diagrammatically in the accompanying drawings, wherein—

A is the foundation plate of my apparatus and is shown as beveled off so as to make a nice appearance in the front of an instrument board, and is apertured at $A^1$ to permit the speed indicated to be seen, and at $A^2$ $A^2$ to show the mileage season and trip indication. $A^3$ is a housing mounted on the base plate A and inclosing and supporting all the various parts of the apparatus. $A^4$ $A^5$ are end frame members projecting upwardly from the base plate A, tied to the housing $A^3$. $A^6$ $A^7$ are side frame members attached at their ends to the members $A^4$ $A^5$.

B is an electric motor of the usual, preferably D. C., type, mounted on a floor plate $B^1$ extending through and mounted on the end frame $A^4$. This motor has associated with it a speed governor $B^2$ and is adapted to be driven from any suitable source of electric power, indicated diagrammatically by the batteries $B^3$. The conductor $B^4$ leads from one terminal of the batteries $B^3$ to a binding post $B^5$ which is connected to one side of the motor circuit. The conductor $B^6$ leads from the other terminal of the battery to an insulated binding post $B^7$ on the end frame $A^4$. From this binding post leads a conductor $B^8$ to one terminal of a spring switch $B^9$. The conductor $B^{10}$ leads from the other terminal to opposed side of the motor, so that when the switch $B^9$ is closed the motor will be driven at a constant rate of speed; when that switch is opened, by means which will subsequently appear, the motor will stop.

The motor shaft carries at the end removed from the governor a worm C in mesh with a worm gear $C^1$. This worm gear is mounted on a shaft $C^2$, and this shaft carries a friction wheel $C^3$ in opposition to a somewhat similar friction wheel $C^4$ mounted on the master screw $C^5$, which screw is rotatably mounted in the brackets $C^6$ $C^7$. $C^8$ is a change speed pinion interposed between the friction wheels $C^3$ $C^4$, adapted as it moves radially between said wheels to change their relative angular velocity. $C^9$ is a thumb screw associated with spring $C^{10}$ and ball bearing $C^{11}$ whereby the operator may control the pressure between the two friction disks and the friction pinion by varying the tension on the spring.

The pinion $C^8$ is mounted for rotation on the shaft D, and this shaft is slidably mounted in the bracket $D^1$, which bracket is pivoted in turn on a pin $D^2$ so arranged that the bracket is free to rotate about a line parallel with the axis of rotation of the pinion $C^8$ to prevent any binding which might otherwise result from variation in the position of one or both of the friction wheels and the pinion arising out of variations in the pressure between them. $D^3$ is a tongued block pinned on the shaft D. It is associated with a slot in the arm $D^4$ whereby the two parts are free to move in a plane perpendicular to the shaft D but are held against movement with respect to one another in a direction parallel with it. $D^5$ is a carriage slidably mounted on the shaft $D^6$ and carrying the arm $D^4$. $D^7$ is a somewhat similar carriage bar slidably mounted on the shaft $D^8$, connected with the carriage or bar $D^5$ by the inclined, slotted cross-piece $D^9$, the parts being so arranged that when the carriage members $D^5$, $D^7$ and $D^9$ move back and forth on the shafts $D^6$, $D^8$ the same reciprocatory movement is given to the friction pinion $C^8$.

Figure 5:
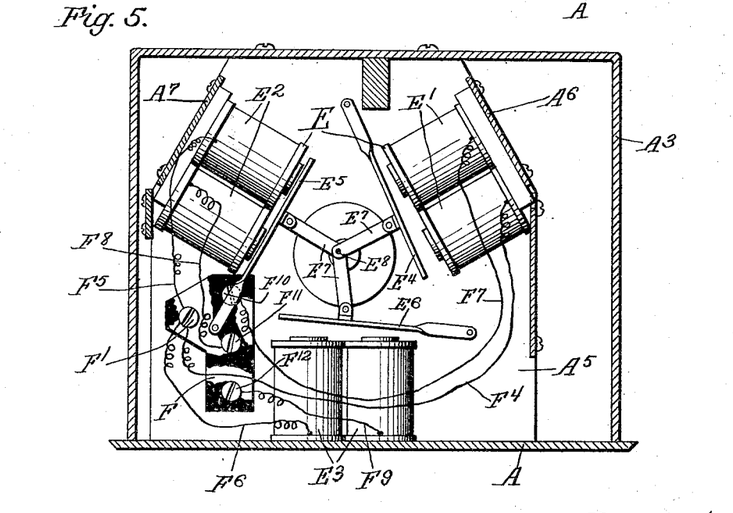
Fig. 5 is a section along the line 5—5 of Fig. 2.
Figure 6:
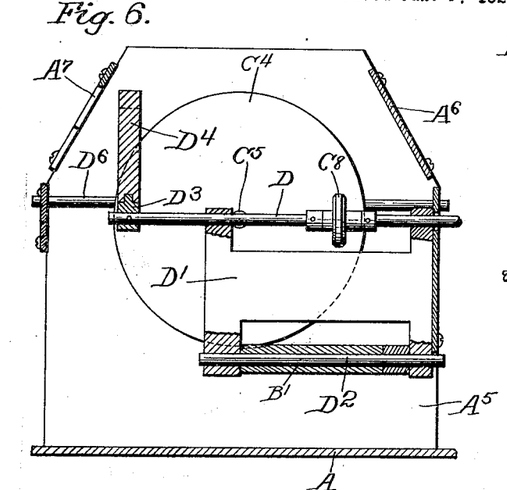
Fig. 6 is a section along the line 6—6 of Fig. 2.
Figure 7:
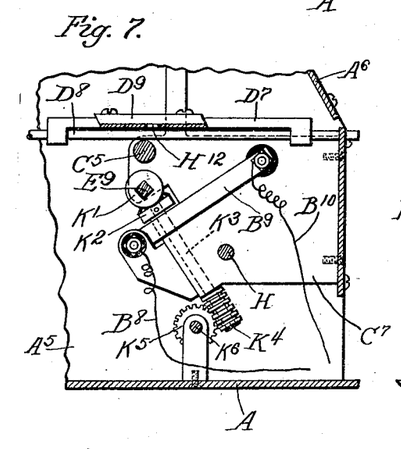
Fig. 7 is a section along the line 7—7 of Fig. 2.
Figure 8:
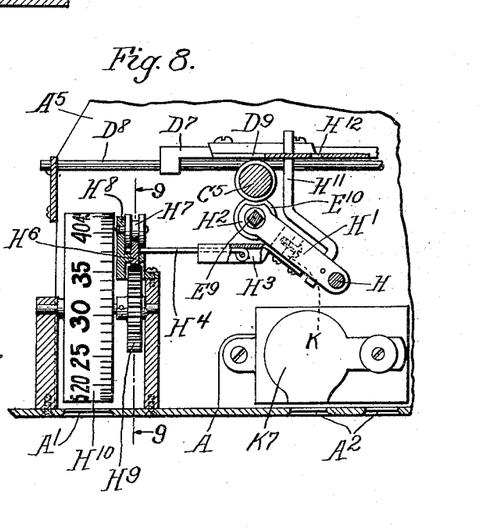
Fig. 8 is a section along the line 8—8 of Fig. 2.
Figure 9:
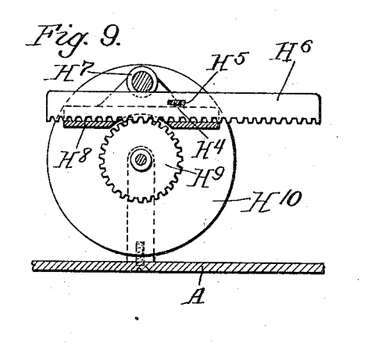
Fig. 9 is a section along the line 9—9 of Fig. 8.

In Fig. 5 is shown an electro-magnetic engine E, made up of a plurality of electro-magnets $E^1$ $E^1$, $E^2$ $E^2$, $E^3$ $E^3$. Each of these electro-magnets has associated with it a pivot armature $E^4$, $E^5$, $E^6$, and there is a series of connecting links $E^7$ $E^7$ leading from each of said armatures to an eccentric crank pin $E^8$ on the end of the square shaft $E^9$. Slidably mounted on the shaft and held against rotation with respect thereto is a worm $E^{10}$ in mesh with the screw $C^5$, this worm being driven by the electro-magnetic engine in opposition to the rotation of the screw $C^5$ driven by the constant speed electric motor.

Figures 10, 11:
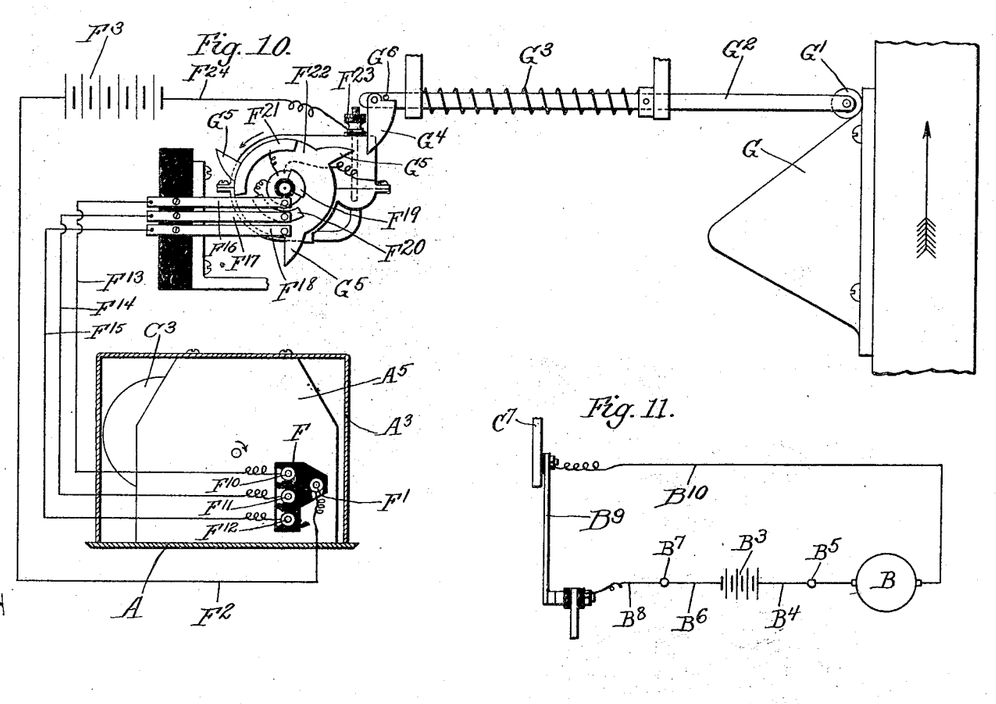
Fig. 10 is a detail wiring diagram and diagrammatic showing of the vehicle wheel-operated mechanism.
Fig. 11 is a wiring diagram of the switch.

Associated with this electro-magnetic engine is a terminal block F. Leading from a binding post $F^1$, on this terminal block is a conductor $F^2$ which leads to a battery or other source of electrical power $F^3$. Leading from the other side of this same terminal post are conductors $F^4$, $F^5$ and $F^6$, which communicate respectively with one terminal of the coils $E^1$, $E^2$ and $E^3$. The other terminals of these coils are connected, respectively, by the conductors $F^7$, $F^8$ and $F^9$ with the binding posts $F^{10}$, $F^{11}$ and $F^{12}$. Leading from the other sides of these respective binding posts, as indicated, are conductors $F^{13}$, $F^{14}$ and $F^{15}$, which terminate respectively in spring switch fingers $F^{16}$, $F^{17}$ and $F^{18}$. These spring fingers have contact buttons on their ends as in indicated in Figure 10, and these buttons are adapted to engage, respectively, the quadrants $F^{19}$, $F^{20}$ and $F^{21}$ on the distributor wheel $F^{22}$. These quadrants are all connected by means of the binding post $F^{23}$ and conductor $F^{24}$ with the other terminal of the power source, so that as the distributor wheel is rotated successive circuits are closed through, first, $E^1$, then $E^2$, then $E^3$, and so on. In the position shown the circuit has just been closed through $E^2$, and as soon as another step has been made the circuit will be through the battery $F^3$, conductor $F^2$, binding post $F^1$, conductor $F^6$, electro-magnet $E^3$, conductor $F^9$, binding post $F^{12}$, spring $F^{18}$, quadrant $F^{21}$, binding post $F^{23}$ and conductor $F^{24}$. As soon as this takes place the electro-magnet $E^3$ will be energized, the armature will be pulled down, and the shaft will be given another third of a rotation. This series of operations continues, first one, then another, and then another, the electro-magnets being energized along as the distributor wheel is rotated.

The distributor wheel is rotated by means of a cam G on the vehicle wheel which cam may be mounted near the periphery of the hub. This cam is adapted once each revolution to contact a roller $G^1$ on the end of a sliding shaft $G^2$ and force this shaft back, compressing a spring $G^3$. The latch $G^4$ at this time will engage one of the arms $G^5$ and rotate the distributor wheel through a third of a revolution. As soon as the cam G is passed on, spring $G^3$ will thrust the rod $G^2$ back into the position shown in Fig. 10, the latch swinging freely away from the stop $G^6$ so that the parts will be in position for another cycle of operations. It will be thus noted that the electro-magnetic engine is so equipped as to give to the worm $E^{10}$ a rotational speed which bears a direct ratio to the speed of the vehicle, because the oftener the vehicle wheel rotates the oftener will the electro-magnetic engine cause the shaft to make a third revolution.

H is a track bar extending parallel with the shaft $E^9$ and screw $C^5$. Traveling along this track bar is a carriage $H^1$ having arms $H^2$ $H^2$ to engage the opposed ends of the worm $E^{10}$ so that as the worm moves back and forth the carriage moves with it. Projecting outwardly from this carriage is a slotted arm $H^3$ in which is slidably and loosely mounted an arm $H^4$, which arm in turn engages the slot $H^5$ in a rack $H^6$. This rack is mounted for longitudinal movement in a direction parallel with the line of movement of the carriage, and is guided from above by means of a grooved roller $H^7$ and below by means of a guide $H^8$. It rests upon a gear $H^9$ on which is mounted a speed indicating drum $H^{10}$, the arrangement being such that as the carriage moves back and forth it carries the rack with it, rotates the drum, and causes the appropriate speed indication to appear on the drum in the window $A^1$. Projecting upwardly from the carriage $H^1$ is a pin $H^{11}$ and this pin engages the slot $H^{12}$ in the slotted cross-piece $D^9$. The result of this is that as the carriage moves back and forth its engagement with the slot $H^{12}$, which serves in effect as a cam, results in moving the cross-piece and the associated parts $D^5$ $D^7$ back and forth in a direction perpendicular to the line of movement of the carriage, and it is therefore the position of this carriage which controls the axial movement of position of the friction pinion between the two friction disks.

K is an insulated contact member on the carriage H¹, adapted to engage the switch B⁹ when the carriage is at the extreme end of its excursion on the left-hand side, (see Fig. 3) for the purpose of opening that switch and stopping the drive of the electric motor, the idea being that at this position the vehicle is at least running, the zero indication should appear, and it can only appear when, after the electro-magnetic engine has quit running, the constant speed motor has run the carriage down to the zero end, at which point the switch breaks the circuit and the constant speed motor will then stop, leaving indication at zero with the switch broken enough to interrupt the current. K¹ K² are pinions, one on the shaft E⁹, the other on an inclosed shaft K³, in mesh with one another, adapted to drive the shaft K³ from the shaft E⁹. K⁴ is a worm on shaft K³ in mesh with a worm wheel K⁵, and this worm wheel is in turn on the shaft K⁶ which drives the odometer K⁷.

While I have endeavored to show by my drawings an operative device, still many changes might be made in size, shape and arrangement of parts without departing materially from the spirit of my invention.

Figure 1:
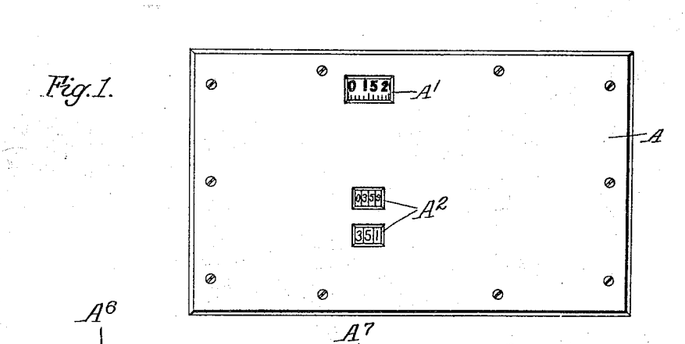
Figure 1 is a front elevation on a reduced scale of the speedometer apparatus as it will appear in the instrument board of a motor vehicle.
Figure 2:
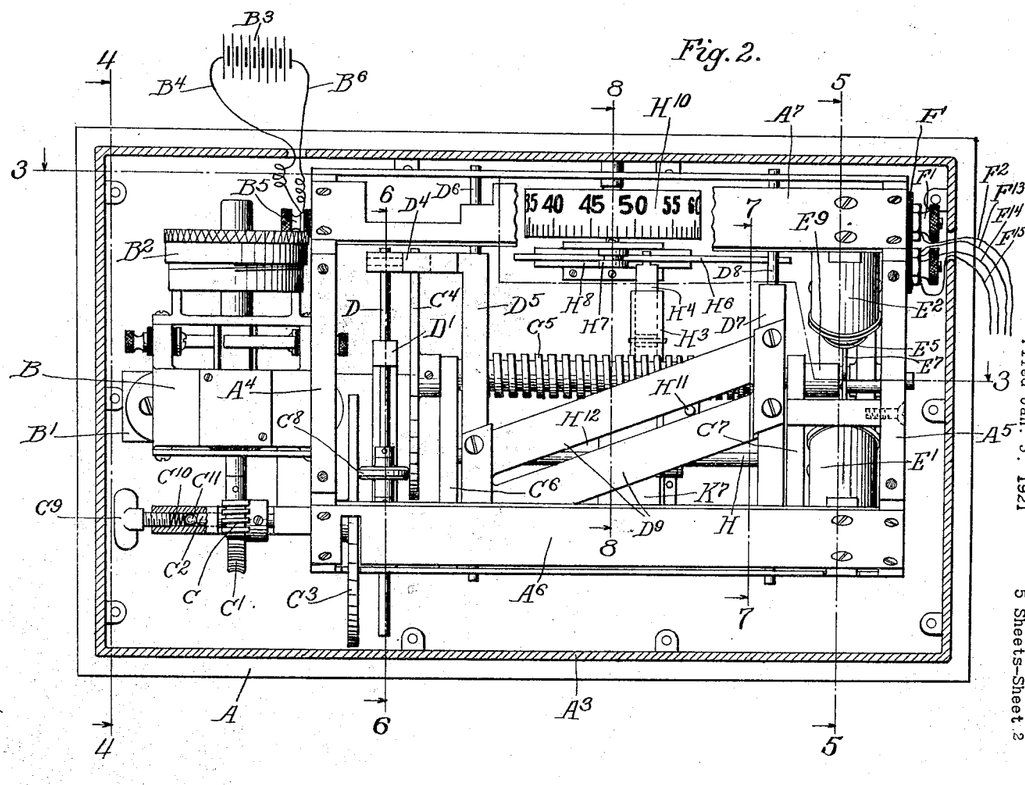
Fig. 2 is a section in a plane parallel with the front face of the apparatus.
Figure 3:
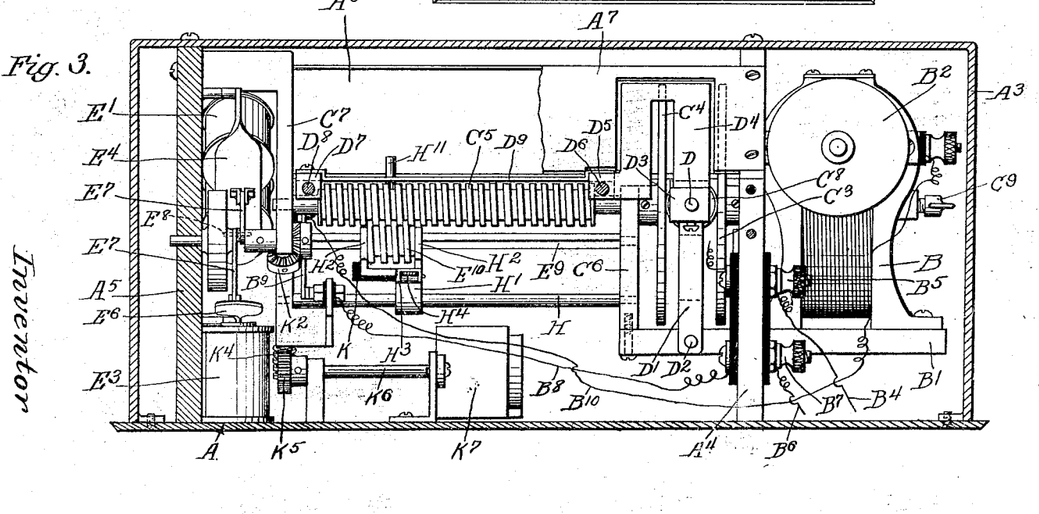
Fig. 3 is a section along the line 3—3 of Fig. 2.
Figure 4:
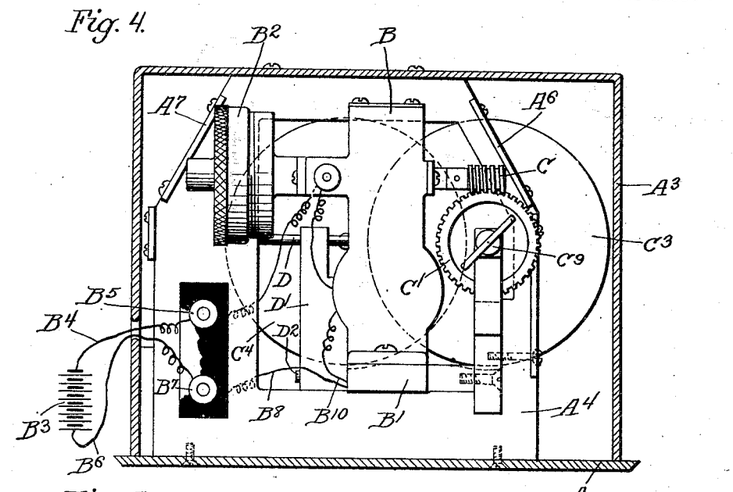
Fig. 4 is a section along the line 4—4 of Fig. 2.

The use and operation of my invention are as follows:

For the purpose of clearness I have illustrated the parts in the position they would assume if the vehicle were traveling at about fifteen miles an hour, but it will be understood that if the speed goes down the pin connecting the carriage and the sliding cross-piece will move to the right, in Fig. 2, or to the left in Fig. 3, until at the end of its excursion it will be at the zero point, the switch will open, and the apparatus will cease functioning.

With the parts in that zero position, when the vehicle starts to move the vehicle wheel will operate the cam to operate the distributing wheel, and this will immediately cause operation of the electro-magnetic engine. There need be no interruption, because without a change in circuit the electro-magnetic engine will, for instance, even where the current is on, maintain the position of parts shown in Fig. 5. As soon as the electro-magnetic engine does commence to function, and as soon as the worm does commence to rotate as a result thereof, the worm will travel up along the screw, the screw being at rest until the carriage driven by the worm releases the spring switch and closes the circuit. Thereupon the electric motor will commence to rotate, driving the screw in such direction as to tend to move the worm back along its shaft in a direction opposite to the direction of its travel, as a result of its own rotary speed.

The speed of the electric motor is a fixed constant, the speed of the worm varies directly as the speed of the vehicle, and the tendency of the independent rotary movements of the worm and screw is to resist one another. In order to get a speed indication, some means must therefore be provided to counterbalance those two tendencies at some point in their possible travel which will bear a fixed and constant relation to the speed traveled by the vehicle; that is the worm must travel only so far and then stop and stay there as long as the speed of the vehicle remains constant.

This result is obtained by means of changing the speed of the screw responsive to the position of the indicating carriage, and this is done with the constant motor speed by arranging for movement of the carriage to displace the friction pinion between the two friction wheels. For instance, if the vehicle speed is fifteen miles an hour and we start with the apparatus, for some reason or other, set to the zero point, we will find that the longitudinal movable friction wheel is very close to the center of the motor-driven disk and very close to the periphery of the disk on the worm. The result of this will be that the speed of rotation of the screw would be low in proportion to the speed of rotation of the worm, and thus the worm will travel out toward the fifteen-mile position. As it does so travel, however, the pin associated therewith, engaging the cam slot, will draw the sliding friction pinion out to increase the speed of rotation of the screw, and this speed increases until, at fifteen miles an hour, the speed of rotation of the screw is balanced by the speed of rotation of the worm and the parts maintain their relative position.

If, now, for some reason or other, we should have our indicating carriage beyond fifteen miles an hour, we would find that the floating friction pinion is nearer the periphery of the motor driven wheel and nearer the center of the wheel mounted on the screw. The result would be to give the screw an unduly high speed, and this would tend to force the screw back independent of its own resisting rotation. This forcing back would continue until the carriage had returned to the fifteen miles an hour position, at which point it would remain until the vehicle speed changed.

I claim:

1. A speedometer comprising an indicating mechanism, two separate driving means therefor adapted conjointly to operate upon the indicating mechanism tending to drive it in different directions at different speeds, one of said driving means including a motor adapted to operate at a speed bearing a fixed relation to the speed to be measured, the other including a motor driven at constant speed, means included in the driving connection between the constant speed motor and the driving means actuated thereby for varying the rate of speed of said driving means dependent on the position of the indicating mechanism.

2. A speedometer comprising an indicating mechanism, two separate driving means therefor adapted conjointly to operate upon the indicating mechanism tending to drive it in different directions at different speeds, one of said driving means including a motor adapted to operate at a speed bearing a fixed relation to the speed to be measured, the other including a motor driven at constant speed, means included in the driving connection between the constant speed motor and the driving means actuated thereby for varying the rate of speed of said driving means dependent on the position of the indicating mechanism, said means comprising a pair of parallel friction wheels and a driving pinion between and in engagement with each of them and means for moving it radially between them.

3. A speedometer comprising an indicating mechanism, two separate driving means therefor adapted conjointly to operate upon the indicating mechanism tending to drive it in different directions at different speeds, one of said driving means including a motor adapted to operate at a speed bearing a fixed relation to the speed to be measured, the other including a motor driven at constant speed, means included in the driving connection between the constant speed motor and the driving means actuated thereby for varying the rate of speed of said driving means dependent on the position of the indicating mechanism, said means comprising a pair of parallel friction wheels and a driving pinion between and in engagement with each of them and means for moving it radially between them, the axis of each of the wheels being adjacent to the periphery of the other.

4. A speedometer comprising an indicating mechanism, two separate driving means therefor adapted conjointly to operate upon the indicating mechanism tending to drive it in different directions at different speeds, one of said driving means including a motor adapted to operate at a speed bearing a fixed relation to the speed to be measured, the other including a motor driven at a constant speed, means included in the driving connection between the constant speed motor and the driving means actuated thereby for varying the rate of speed of said driving means dependent on the position of the indicating mechanism, said means comprising a pair of parallel friction wheels and a driving pinion between and in engagement with each of them and means for moving it radially between them, the means for moving the pinion comprising a cam associated with the indicator and adapted to shift the pinion as it moves with the indicator.

5. A speedometer comprising an indicating mechanism, two separate driving means therefor adapted conjointly to operate upon the indicating mechanism tending to drive it in different directions at different speeds, one of said driving means including a motor adapted to operate at a speed bearing a fixed relation to the speed to be measured, the other including a motor driven at constant speed, means included in the driving connection between the constant speed motor and the driving means actuated thereby for varying the rate of speed of said driving means dependent on the position of the indicating mechanism, said means comprising a pair of parallel friction wheels and a driving pinion between and in engagement with each of them and means for moving it radially between them, the axis of each of the wheels being adjacent to the periphery of the other, the means for moving the pinion comprising a cam associated with the indicator and adapted to shift the pinion as it moves with the indicator.

6. A speedometer comprising an indicating mechanism two separate driving means therefor, adapted conjointly to operate thereupon tending to drive it in opposite directions at different speeds, a constant speed motor operating one of the driving means, and a motor traveling at a rate of speed directly dependent upon the speed being measured operating the other and a speed control mechanism interposed between the constant speed motor and the driving means driven by it.

7. A speedometer comprising an indicating mechanism two separate driving means therfor, adapted conjointly to operate thereupon tending to drive it in opposite directions at different speeds, a constant speed motor operating one of the driving means, and a motor traveling at a rate of speed directly dependent upon the speed being measured operating the other, and means interposed between the constant speed motor and the driving means driven by it for changing the speed of such driving means in co-ordination with variations in the position of the indicating mechanism.

8. A speedometer comprising an indicating mechanism two separate driving means therefor, adapted conjointly to operate thereupon tending to drive it in opposite directions at different speeds, a constant speed motor operating one of the driving means, and a motor traveling at a rate of speed directly dependent upon the speed being measured operating the other, and means interposed between the constant speed motor and the driving means for changing the speed of such driving means in co-ordination with variations in the position of the indicating mechanism, said speed control mechanism including an adjacent friction disc, a radially movable pinion in engagement therewith and means for shifting said pinion.

9. A speedometer comprising an indicating mechanism two separate driving means therefor, adapted conjointly to operate thereupon tending to drive it in opposite directions at different speeds, a constant speed motor operating one of the driving means, and a motor traveling at a rate of speed directly dependent upon the speed being measured operating the other, and means interposed between the constant speed motor and the driving means for changing the speed of such driving means in co-ordination with variations in the position of the indicating mechanism, said speed control mechanism including an adjacent friction disc, a radially movable pinion in engagement therewith and means for shifting said pinion, said pinion shifting means comprising a movable cam member actuated by the movement of the indicator.

10. A speedometer comprising two meshing screw threads movable longitudinally with respect one to another, means for separately driving them, the driving speed of one of them being independent of their relative longitudinal position, the driving means for the other being adapted to change the speed of such screw in response to the change in relative longitudinal position of the two screws, said means comprising in both cases an electric motor, there being a change speed mechanism interposed between one of said motors and the screw comprising a friction gear.

11. A speedometer comprising two meshing screw threads movable longitudinally with respect one to another, means for separately driving them, the driving speed of one of them being independent of their relative longitudinal position, the driving means for the other being adapted to change the speed of such screw in response to the change in relative longitudinal position of the two screws, said means comprising in both cases an electric motor, there being a change speed mechanism interposed between one of said motors and the screw comprising a friction disc, a pinion in mesh with it and means for radially displacing the pinion along the face of the disc.

12. A speedometer comprising two meshing screw threads movable longitudinally with respect one to another, means for separately driving them, the driving speed of one of them being independent of their relative longitudinal position, the driving means for the other being adapted to change the speed of such screw in response to the change in relative longitudinal position of the two screws, said means comprising in both cases an electric motor, there being a change speed mechanism interposed between one of said motors and the screw comprising a friction gear, means responsive to change in relative position of said screws for operating said change speed gear.

13. A speedometer comprising two meshing screw threads movable longitudinally with respect one to another, means for separately driving them, the driving speed of one of them being independent of their relative longitudinal position, the driving means for the other being adapted to change the speed of such screw in response to the change in relative longitudinal position of the two screws, said means comprising in both cases an electric motor, there being a change speed mechanism interposed between one of said motors and the screw comprising a friction disc, a pinion in mesh with it and means for radially displacing the pinion along the face of the disc, means responsive to change in relative position in said screws for moving said pinion across the face of the friction disc.

14. A speedometer comprising two meshing screw threads movable longitudinally with respect one to another, means for separately driving them, the driving speed of one of them being independent of their relative longitudinal position, the driving means for the other being adapted to change the speed of such screw in response to the change in relative longitudinal position of the two screws, said means comprising in both cases an electric motor, there being a change speed mechanism interposed between one of said motors and the screw comprising a friction gear, means responsive to change in relative position of said screws for operating said change speed gear, said means comprising a movable cam member and a part engaging and adapted to move said cam, mounted on one of said screws.

15. A speedometer comprising two meshing screw threads movable longitudinally with respect one to another, means for separately driving them, the driving speed of one of them being independent of their relative longitudinal position, the driving means for the other being adapted to change the speed of such screw in response to the change in relative longitudinal position of the two screws, said means comprising in both cases an electric motor, there being a change speed mechanism interposed between one of said motors and the screw comprising a friction disc, a pinion in mesh with it and means for radially displacing the pinion along the face of the disc, means responsive to change in relative position of said screws for moving said pinion across the face of the friction disc, said means comprising a movable cam member and a part engaging and adapted to move said cam mounted on one of said screws.

16. A speed indicator comprising a pair of electric motors, means for driving one of them at a rate of speed dependent upon the speed to be measured and means for driving the other at a fixed speed, a movable indicator and driving connection between each motor and the indicator operating independently and in opposition thereon and means controlled by the position of said indicator for varying the rate of speed at which one of said driving connections is driven, said means comprising a transmission gear between the fixed speed motor and the driving connection.

17. A speed indicator comprising a pair of electric motors, means for driving one of them at a rate of speed dependent upon the speed to be measured and means for driving the other at a fixed speed, a movable indicator and driving connection between each motor and the indicator operating independently and in opposition thereon and means controlled by the position of said indicator for varying the rate of speed at which one of said driving connections is driven, said means comprising a transmission gear between the fixed speed motor and the driving connection a cam member adapted to operate said transmission mechanism and a member carried by the indicator engaging and operating said cam.

18. A speed indicator comprising a pair of motors, a speed indicating mechanism and a driving connection between it and each motor operating independently and upon the indicating mechanism, means for driving one of said motors at a variable speed depending upon the speed to be measured, means for driving the other at a fixed speed and a variable speed transmission interposed between the fixed speed motor and its driving mechanism adapted to be controlled by the position of the indicating mechanism.

19. A speed motor comprising two meshing friction threads pitched in the same direction one being longitudinally movable, the other longitudinally fixed, separate means for driving them comprising electric motors, one of them being driven at a speed dependent upon the rate of speed to be measured, the other being driven at a fixed speed, and a speed change transmission interposed between the latter motor and one of the screws for changing the rate of speed of said screw in response to change in relative longitudinal position of the two screws.

20. In a speedometer, an electric motor adapted to operate at constant speed, an electro magnetic engine and means for operating it at a rate of speed dependent upon the rate of speed to be measured, an indicator, two separate drive means operated by said motors adapted conjointly to operate on the indicating mechanism tending to drive it in opposite directions at different speeds and means controlled by the indicating mechanism for changing the rate at which the motor drives its driving mechanism.

21. In a speedometer, an electric motor adapted to operate at constant speed, an electro magnetic engine and means for operating it at rate of speed dependent upon the rate of speed to be measured, an indicator, two separate drive means operated by said motors adapted conjointly to operate on the indicating mechanism tending to drive it in opposite directions at different speeds and means controlled by the indicating mechanism for changing the rate at which the motor drives its driving mechanism, said means comprising the change speed gear controlled by the indicator.

22. In a speedometer, an electric motor adapted to operate at constant speed, an electro magnetic engine and means for operating it at a rate of speed dependent upon the rate of speed to be measured, an indicator, two separate drive means operated by said motors adapted conjointly to operate on the indicating mechanism tending to drive it in opposite directions at different speeds and means controlled by the indicating mechanism for changing the rate at which the motor drives its driving mechanism, said means comprising a friction disc and pinion, a guide member operated by the lateral displacement of the indicator for shifting the pinion across the face of the disc.

23. In a speedometer a longitudinally movable indicating member, two separate driving means operating thereupon tending to move it in opposite directions at different speeds, one of said driving means operating at a rate of speed dependent upon the rate of speed to be measured, the other operating at a rate of speed dependent upon the position of the indicator, means for controlling the rate of speed of such second driving member including a carriage movable across the line of travel of the indicator, a cam slot associated with said carriage and a member on the indicator engaging said slot whereby movement of the indicator in one direction causes the carriage to move across the line of travel thereof.

24. In a speedometer a longitudinally movable indicating member, two separate driving means operating thereupon tending to move it in opposite directions at different speeds, one of said driving means operating at a rate of speed dependent upon the position of the indicator, means for controlling the rate of speed of such second driving member including a carriage movable across the line of travel of the indicator, a cam slot associated with said carriage and a member on the indicator engaging said slot whereby movement of the indicator in one direction causes the carriage to move across the line of travel thereof, the driving member controlled by the indicator including a fixed speed motor and a change speed transmission which change speed transmission is controlled by the cam actuated carriage.

25. In a speedometer a longitudinally movable indicating member, two separate driving means operating thereupon tending to move it in opposite directions at different speeds, one of said driving means operating at a rate of speed dependent upon the position of the indicator, means for controlling the rate of speed of such second driving member including a carriage movable across the line of travel of the indicator, a cam slot associated with said carriage and a member on the indicator engaging said slot whereby movement of the indicator in one direction causes the carriage to move across the line of travel thereof, the driving member controlled by the indicator including a fixed speed motor and a change speed transmission which change speed transmission is controlled by the cam actuated carriage, said change speed transmission comprising a friction disc in engagement with a friction pinion, the pinion being carried by the carriage adapted to be moved by the carriage radially across the face of the disc.

26. In a speedometer, two electric motors one of them driven at constant speed, the other at a speed controlled by the speed to be measured, an indicator between them, means separately driven by said motors tending to move the indicator in opposite directions at varying speeds, and a mechanical speed control interposed between the fixed speed motor and its indicator dependent upon the position of the indicator to vary the speed of its drive.

27. A speedometer comprising an indicating element, two separate driving means adapted to operate conjointly upon said element, one of said driving means including a motor adapted to rotate at a speed bearing a fixed relation to the speed to be measured, the other including a motor driven at constant speed, and means responsive to the speed of rotation of the former for varying the speed of rotation of the latter.

28. A speedometer comprising an indicating element, two separate driving means adapted to operate conjointly upon said element, one of said driving means including a motor adapted to rotate at a speed bearing a fixed relation to the speed to be measured, the other including a motor driven at constant speed, the former adapted to move longitudinally in relation to the latter, in response to changes in the speed being measured, and means responsive to the position of the former in relation to the latter for varying the speed of rotation of the latter.

Signed at Chicago county of Cook and State of Illinois, this 24th day of December 1920.

GUY W. BLACKBURN.